United States Patent
Kokku et al.

(10) Patent No.: US 8,923,239 B2
(45) Date of Patent: *Dec. 30, 2014

(54) METHOD AND SYSTEM FOR CUSTOMIZABLE FLOW MANAGEMENT IN A CELLULAR BASESTATION

(71) Applicant: NEC Laboratories America, Inc., Princeton, NJ (US)

(72) Inventors: Ravindranath Kokku, Hyderabad (IN); Rajesh Mahindra, Highland Park, NJ (US); Honghai Zhang, Seattle, WA (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,431

(22) Filed: Apr. 8, 2014

(65) Prior Publication Data

US 2014/0233485 A1    Aug. 21, 2014

Related U.S. Application Data

(60) Continuation of application No. 13/732,468, filed on Jan. 2, 2013, now Pat. No. 8,700,047, which is a division of application No. 13/037,445, filed on Mar. 1, 2011, now Pat. No. 8,351,948.

(60) Provisional application No. 61/309,110, filed on Mar. 1, 2010.

(51) Int. Cl.
*H04B 1/26*   (2006.01)
*H04W 72/04*  (2009.01)
*H04L 12/875* (2013.01)
*H04W 28/02*  (2009.01)
*H04W 88/08*  (2009.01)

(52) U.S. Cl.
CPC ......... *H04W 72/0433* (2013.01); *H04L 47/564* (2013.01); *H04W 28/02* (2013.01); *H04W 88/08* (2013.01)
USPC ........... 370/329; 370/338; 370/331; 370/339; 370/328; 455/266; 455/450; 455/466; 455/451

(58) Field of Classification Search
CPC . H04W 28/16; H04W 72/04; H04W 72/0493; H04W 72/1252; H04W 76/06; H04W 72/10
USPC .......... 370/329, 338, 339, 328; 455/266, 450, 455/466, 451

See application file for complete search history.

(56) References Cited

U.S. PATENT DOCUMENTS

| | | | |
|---|---|---|---|
| 2004/0114617 A1* | 6/2004 | Sim et al. | 370/413 |
| 2007/0195787 A1* | 8/2007 | Alnuweiri et al. | 370/395.4 |
| 2011/0045838 A1* | 2/2011 | Furuskar et al. | 455/452.2 |

FOREIGN PATENT DOCUMENTS

KR    20090066167    *   6/2009

* cited by examiner

*Primary Examiner* — Khalid Shaheed
(74) *Attorney, Agent, or Firm* — Joseph Kolodka; Akitaka Kimura

(57) ABSTRACT

A basestation used in a wireless communications system is disclosed. The basestation includes a plurality of flow management schedulers, wherein the base station receives an indication of function selection from an entity, and wherein the base station chooses for the entity one of the plurality of flow management schedulers according to the indication of function selection. Other methods, apparatuses, and systems also are disclosed.

4 Claims, 3 Drawing Sheets

METHOD AND SYSTEM FOR CUSTOMIZABLE FLOW MANAGEMENT IN A CELLULAR BASESTATION

This application is a continuation of co-pending U.S. patent application Ser. No. 13/732,468, entitled "Method and System for Customizable Flow Management in a Cellular Basestation", filed Jan. 2, 2013, which in turn a divisional of U.S. patent application Ser. No. 13/037,445, entitled "METHOD AND SYSTEM FOR CUSTOMIZABLE FLOW MANAGEMENT IN A CELLULAR BASESTATION", filed Mar. 1, 2011, which in turn claims the benefit of U.S. Provisional Application No. 61/309,110, entitled "NVS: A Virtualization Substrate for WiMax Networks", filed Mar. 1, 2010, the contents of both of which are incorporated herein by reference.

This application is related to U.S. patent application Ser. No. 13/037,442, entitled "METHOD AND SYSTEM FOR VIRTUALIZING A CELLULAR BASESTATION", filed Mar. 1, 2011, the contents of which are incorporated herein by reference.

BACKGROUND OF THE INVENTION

The present invention relates generally to wireless communications and more particularly to a method and system for customizable flow management in a cellular basestation.

Mobile virtual network operators MVNOs are emerging as strong players in the mobile network market to provide enhanced services such as video telephony, live streaming and interactive games (along with traditional voice services) to focused customers. This model is argued to be a win-win situation for both MVNOs and mobile network operators MNOs, since MVNOs help MNOs attract and retain a greater number of customers. For MNOs and MVNOs, customizability fosters greater innovation in flow management and other services to achieve differentiation from their competitors (100 and 102). For controlled evaluation of innovations (101), greater customizability would enable deploying and testing new solutions without recompiling or rebooting the basestations. In addition, most basestation manufacturers restrict access to the basestations they provide to the MNOs. Customization would provide MNOs with more access to the flow management with little modification to the basestation. The MNOs can pass this functionality to the different MVNOs it hosts.

As revenue from voice services is decreasing rapidly, data services are receiving increased focus from WiMAX, 3G and LTE network operators. Already, more sophisticated data plans for revenue generation on 3G networks have emerged, and are constantly evolving. Many of these sophisticated data plans include corporate bundle plans where the bandwidth is shared across a group of employees of a corporation. The management policies of flows/group of flows for a corporation or an enterprise have unique requirements. A network with customized flow management would be an ideal fit for enterprises offering wireless services to its employees. Further corporate intranets can be made accessible to users "everywhere" through complete virtualization of the network resources (101).

The goal of the global environment for network innovations GENI is to enable a general virtualized environment for supporting experimentation and prototype deployments for studying innovative technologies in large-scale real life scenarios (101). This has not been possible in the past since mobile network operator MNO equipment has been closed for experimentation. Customization can help MNOs to provide a way to deploy and test innovative ideas, while running operational networks. This provides a win-win situation for both network providers and researchers.

Currently, there are no teachings on providing customizability on cellular wireless basestations over technologies such as WiMAX and LTE. Many researchers rely on simulations to evaluate new scheduling processes, but simulations are ineffective in modeling the different real-world scenarios. Moreover, no prior scheduling discipline allowed execution of customized flow management by an outside entity on a wireless basestation. MNOs and MVNOs have relied on the efficiency of the flow management implemented in the basestations by the basestation equipment manufacturers.

Accordingly, there is a need for customizable and adaptive flow-management that provides an interface for flow management in cellular basestations such as WiMAX and LTE.

BRIEF SUMMARY OF THE INVENTION

The present invention generally provides a method for customizable flow management in a cellular basestation including configuring a framework on a cellular basestation; and executing customized flow management functions through the framework by an external entity.

In the preferred embodiment, the framework includes programming interfaces for enabling at least one of a selection and definition of distinct means for specifying flow management functions and the flow management functions include at least one of a virtual time tagging, a scheduler selection and a model specification. Preferably, for the virtual time tagging the entity marks packets with a virtual time that determines the order in which packets are transmitted, the basestation sends packets in the order of the virtual time tags embedded in each packet and the entity marks packets based on feedback from the basestation. Preferably, for the model specification the basestation allows the entity to specify at least one of a function and a pre-computed table of parameters to weight combinations that enables the basestation to determine weights dynamically, with the weights being used to define an order of packet transmissions. Preferably, for the scheduler selection a specific flow management function is chosen from a pre-defined set of functions already implemented within the basestation. Preferably, the customized flow management functions include at least one of being implemented either outside or inside the basestation and changed dynamically by the entity at run-time. An example of being outside the basestation includes a loadable module and being inside the basestation includes a virtual machine.

The present invention generally provides for a cellular basestation configured with flow management including means configuring a framework on a cellular basestation; and means for executing customized flow management functions through the framework by an external entity.

These and other advantages of the invention will be apparent to those of ordinary skill in the art by reference to the following detailed description and the accompanying drawings.

DETAILED DESCRIPTION

The present invention is directed to a customizable and adaptive flow-management emulator (CAFE) that provides an interface for flow management in cellular basestations such as WiMAX and LTE. The inventive CAFE enables deploying different custom flow management schedulers designed for diverse performance objectives on the same basestation.

The inventive CAFE provides a generic framework that enables entities, either from within the basestation or outside the basestation, to dynamically configure and execute custom flow management. CAFE defines several interfaces/APIs that allow entities to configure the basestation in distinct ways. These different approaches ensure that the same basestation design can meet the requirements of a broader class of entities. Entities could refer to MNOs, MVNOs, Corporate/enterprise networks, and Experimenters/researchers. Entities may execute outside the physical boundaries of the basestation or within the basestation (e.g., As a Virtual Machine inside the basestation).

Figure 1:
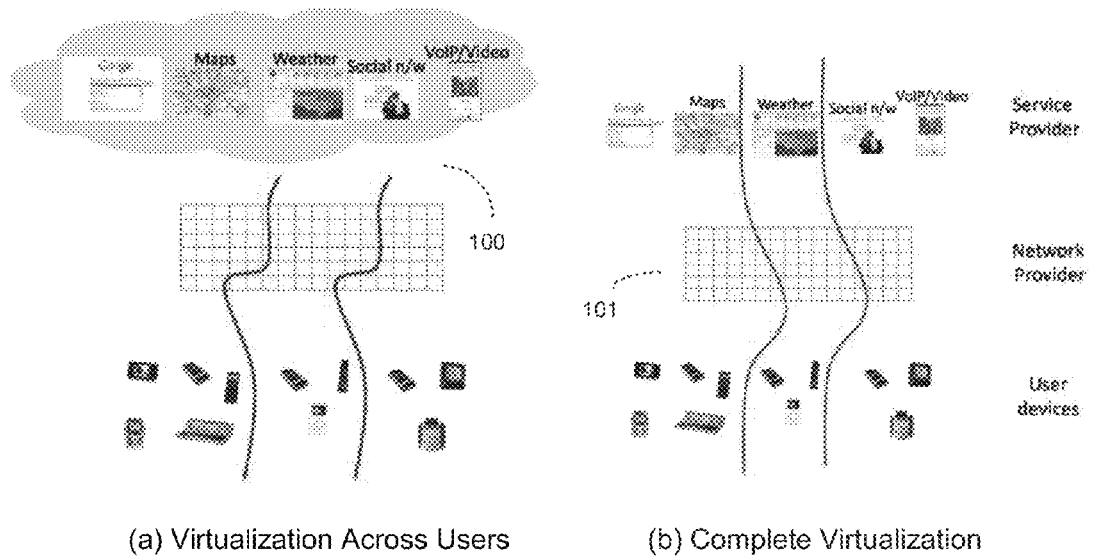
FIG. 1 is depicts exemplary deployment scenarios that benefit from customizable and adaptive low management in accordance with the invention: (a) Virtualization across Users 100; (b) Complete Virtualization 101; and (c) Virtualization across Services 102.
Figure 2:
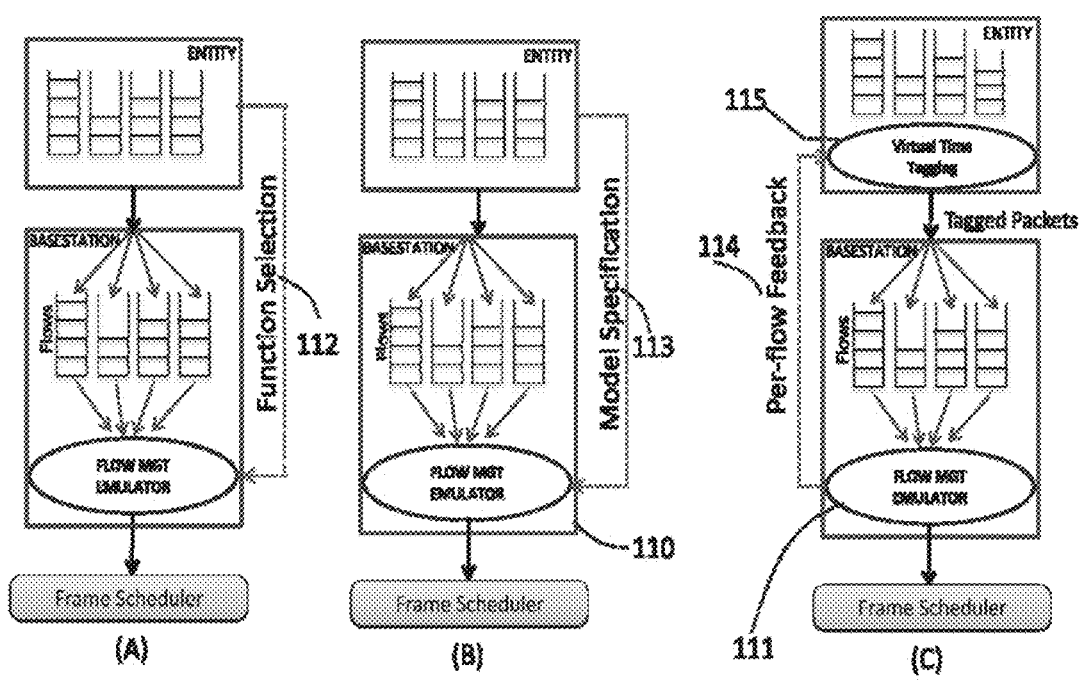
FIG. 2 is an exemplary diagram of a customizable and adaptive flow management emulator, in accordance with the invention.

Referring now to FIG. 2, there is shown a block diagram of the inventive CAFE that is a flow management emulation framework that is preferably implemented as part of a cellular basestation. The inventive CAFE includes a flow management emulator 111, a function selection 112, a model specification 113, a model specification 113, a per-flow feedback 114, and a virtual time tagging 115.

The flow management emulator 111 enables the CAFE to provide programming interfaces to let an entity determine the order in which packets of the different flows are to be transmitted. For maximum flexibility and efficiency, the resources have to be allocated at fine timescales such as on a per-packet or per-MAC-frame basis.

Three approaches are defined in CAFE for giving entities the flexibility to specify flow scheduling that has different merits and demerits: function selection 112, model specification 113, and virtual time tagging 114.

With the Function Selection 112 approach, the inventive CAFE provides a variety of commonly employed schedulers that an entity can choose from. This approach may be very attractive to entities like MVNOs, corporate networks, or service providers with no expertise in wireless networking and prefer relying on the basestation to take care of flow management. This approach, however, is not suitable for evaluating new innovations.

With the Model Specification 113 approach, the inventive CAFE provides a programming interface to specify on a per-class or per-flow basis, the weight distribution as a function of the average rate already achieved, modulation and coding scheme, packet loss, the flow's minimum reserved rate and maximum sustained rate. The weight distribution is sent as a set of discrete tuples that are stored in a table in the basestation that CAFE looks-up during flow scheduling. CAFE emulates flow scheduling by choosing the flow(s) in the decreasing order of the weights. For flows with the same weight, CAFE chooses the flow with lower average rate achieved. This approach is general in that a large number of flow schedulers such as RR, WRR and proportional fair, can be specified as a set of discrete tables. However, this approach has a drawback; flow management functions for which the set of weights cannot be represented offline and/or depends on online information such as current allocation of other flows, current channel conditions, etc. cannot be emulated by this approach.

With the per-flow feedback 114 approach, the inventive CAFE provides flow-level feedback to the entity to perform flow scheduling itself, and place a tag on each packet of the flow with a virtual time that monotonically increases. The per-flow feedback includes average rate achieved, packet loss, MCS etc. In this case, CAFE picks from the flows, the packet among all packets at the heads of the flow queues that has the least virtual time. While this approach enables arbitrary flow schedulers to be defined, the drawback of this approach is that the feedback interval impacts the scheduling decisions and may require the entity to be as close to the basestation as possible. Both Model Specification and Virtual Time Tagging may execute within the basestation as Virtual Machines or loadable modules or external entities such as gateways or routers (e.g., ASN gateway or CSN for WiMAX).

When using the Virtual Time Tagging 115 approach for the CAFE, the entity needs to take care of flow scheduling and tagging each packet with the correct virtual time so that CAFE sends out the packets in the desired order. The flow scheduler in the entity makes use of the per-flow feedback from the basestation in order to schedule the order of the packets.

Figure 3:
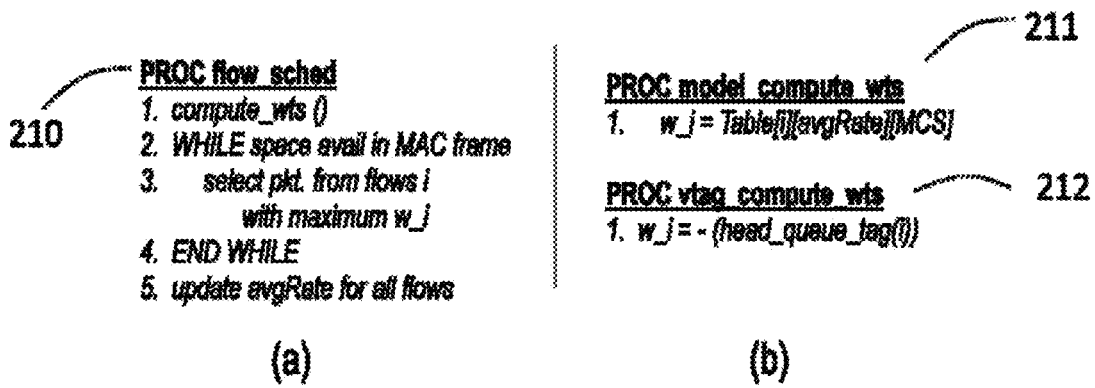
FIG. 3 is a diagram steps for computing flow and weight for a MAC frame, in accordance with the invention.

Henceforth, we describe the core engine behind CAFE using an example of a CAFE implementation shown in FIG. 3. For choosing a flow, CAFE may use the following specific method: For each MAC frame, select a flow with the maximum weight. Repeat this until the MAC frame is completely filled up or all flows are satisfied 210, FIG. 3(a).

```
PROCflow_sched
compute_wts( )
WHILE space avail in MAC frame
    selectpkt from flows i
        with maximum w_i
END WHILE
update avgRate for all flows
```

Depending on the choice of the approach to be used in the inventive CAFE, the model specification weight calculation 211 or virtual time tagging weight calculation 212 are employed to compute the weight of each flow.

For each MAC frame, select flow with the maximum weight. Repeat this until the MAC frame is completely filled up or all flows are satisfied. Depending on the choice of the approach to be used in CAFE, the model specification or virtual tagging are employed to compute the weight of each flow, 1. $w\_j$=Table [i][avgRate][MCS], 211, 1. $w\_j$=−(head_queue_tag(i)), 212 respectively in FIG. 3, (b).

Alternatively, even fine-grained customization can be achieved (with increased run-time overhead) by executing compute_wts( ) and update avgRate within the WHILE; ie. Weight re-evaluation is done on a per-packet basis.

With the model specification weight calculation 211 the weight of a flow is computed from the weight distribution provided to the CAFE. The weight distribution of each flow is provided as a table of weights for different values of average rate, MCS and/or packet loss.

With the virtual time tagging weight calculation 212 the weight is a value directly mapped from the virtual time tag of the packet at the head of the line of each queue. The entity has to mark each packet with an explicit tag to ensure the order of packet transmission is maintained.

Among the innovations of the inventive CAFE are the design and execution of the flow management emulator 111. The function selection 112, model specification 113 and per-flow feedback 114 are required to support the flow management emulator 111 with three different approaches. The inventive architecture to enable custom flow schedulers supports multiple customized, programmable and dynamically installable/configurable flow management functions. The three approaches 1112-114 enable dynamically configuring the custom flow management function by an entity present within the basestation or outside it.

Among many advantages with the invention, the inventive CAFE allows basestation providers to realize a programmable basestation for flow management without giving complete information about the design of the basestation. The inventive CAFE allows network providers, virtual network providers and service providers to run custom resource management functions from within or outside the basestations easily, a feature non-existent today. The CAFE also removes the requirement of re-compilation/re-powering/re-booting of the basestation for enabling new flow management customizations.

The combination of the inventive flow management emulator 111, the function selection 112, the model specification 113 and the per-flow feedback 114 lead to at least the following advantages: 1) an ability to create, modify and execute arbitrary flow management algorithms on an otherwise closed basestation; 2) new business models such as MVNOs, corporate networks having more control over their flow management, and (3) better management through ease of programmability, and incremental innovation and evolution of basestations.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method implemented in a base station having a plurality of flow management schedulers and used in a wireless communications system, the method comprising:
   receiving an indication of model specification from an entity through programming interface; and
   performing flow-scheduling according to the indication of modal specification, wherein the indication of model specification includes at least one of weight distribution, a modulation and coding scheme (MCS), a packet loss, a minimum reserved rate of a flow, and a maximum sustained rate of a flow,
   wherein the weight distribution comprises a function of an average rate achieved or a set of discrete tuples.

2. The method as in claim 1, wherein the entity comprises at least one of a mobile network operator (MNO), a mobile virtual network operator (MVNO), a corporate network, and a service provider.

3. The method as in claim 1, wherein the indication of model specification is on a per-class basis or on a per-flow basis.

4. A method implemented in a base station having a plurality of flow management schedulers and used in a wireless communications system, the method comprising:
   receiving an indication of model specification from an entity through programming interface; and
   performing flow-scheduling according to the indication of model specification,
   wherein the base station performs flow-scheduling by choosing flows in a decreasing order of weights, and
   wherein, for flows with the same weight, the base station performs flow-scheduling by choosing a flow with a lower average rate achieved.

* * * * *